United States Patent
Kumano

(10) Patent No.: US 6,768,848 B2
(45) Date of Patent: Jul. 27, 2004

(54) OPTICAL FIBER AND OPTICAL TRANSMISSION LINE USING THE SAME, AND OPTICAL TRANSMISSION SYSTEM

(75) Inventor: Naomi Kumano, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 305 days.

(21) Appl. No.: 10/108,467

(22) Filed: Mar. 29, 2002

(65) Prior Publication Data

US 2003/0021562 A1 Jan. 30, 2003

(30) Foreign Application Priority Data

Mar. 30, 2001 (JP) ........................................ 2001-100422

(51) Int. Cl.$^7$ ................................................. G02B 6/16
(52) U.S. Cl. ........................ 385/123; 385/124; 385/127
(58) Field of Search ................................. 385/123–127

(56) References Cited

U.S. PATENT DOCUMENTS

| | | | |
|---|---|---|---|
| 5,317,516 A | 5/1994 | Taijonlahti et al. | |
| 5,553,185 A | 9/1996 | Antos et al. | |
| 5,579,428 A | 11/1996 | Evans et al. | |
| 5,684,909 A | 11/1997 | Liu | |
| 5,748,824 A | 5/1998 | Smith | |
| 5,878,182 A | 3/1999 | Peckham | |
| 5,905,838 A | 5/1999 | Judy et al. | |
| 6,011,892 A | 1/2000 | Chraplyvy et al. | |
| 6,169,837 B1 | 1/2001 | Kato et al. | |
| 6,266,467 B1 | 7/2001 | Kato et al. | |
| 6,396,987 B1 | 5/2002 | de Montmorillon et al. | |
| 2001/0016951 A1 | 8/2001 | Sommer et al. | |
| 2002/0054743 A1 * | 5/2002 | Montmorillon et al. | 385/124 |
| 2002/0191927 A1 * | 12/2002 | Liu | 385/123 |
| 2003/0118307 A1 * | 6/2003 | Gruner-Nielsen et al. | 385/127 |

* cited by examiner

*Primary Examiner*—Hemang Sanghavi
(74) *Attorney, Agent, or Firm*—Oblon, Spivak, McClelland, Maier & Neustadt, P.C.

(57) ABSTRACT

The present invention provides an optical fiber forming an optical transmission line for wavelength division multiplexing transmission in a 1.5 $\mu$m wavelength band, for example. The cutoff wavelength is set in the range of 1.3 $\mu$m or more to 1.4 $\mu$m or less, and the chromatic dispersion value at a wavelength of 1.55 $\mu$m is set to 4 to 10 ps/nm/km. The effective core area in at least a setup wavelength band of the 1.5 $\mu$m wavelength band is set to 40 $\mu m^2$ to 60 $\mu m^2$, and the dispersion slope in the 1.55 $\mu$m wavelength band is set to a positive value below 0.035 ps/nm$^2$/km. The zero dispersion wavelength is set to 1.43 $\mu$m or less, and the bending loss at the diameter of 20 mm in the 1.5 $\mu$m wavelength band is set to 5 dB/m or less. The refractive index profile of the optical fiber is designed so that the relative refractive index difference $\Delta 1$ of a first glass layer (1) of the innermost layer from a standard layer (6) and the relative refractive index difference $\Delta 3$ of a third glass layer (3) at a third-layer position from the innermost from the standard layer (6) are set to positive values, and the relative refractive index difference $\Delta 2$ of a second glass layer (2) at a second-layer position from the innermost from the standard layer (6) is set to a negative value.

16 Claims, 4 Drawing Sheets

OPTICAL FIBER AND OPTICAL TRANSMISSION LINE USING THE SAME, AND OPTICAL TRANSMISSION SYSTEM

BACKGROUND OF THE INVENTION

1. Field of the Invention

The present invention relates to an optical fiber used for optical transmission such as wavelength division multiplexing transmission or the like in a wavelength band of 1.5 μm, an optical transmission line using the optical fiber, and an optical transmission system.

2. Background of the Invention

Development of information society is promoting rapid increase of communication information quantity. Such an increase of information makes people pay attention to techniques for WDM (wavelength division multiplexing) transmission and TDM (time division multiplexing) transmission. The WDM transmission is a system for transmitting plural lights of different wavelengths through a single optical fiber, and thus it is an optical transmission system suitable for large-capacity and high bit-rate communications. Recently, the techniques for the wavelength division multiplexing transmission have been actively studied.

Recently, it has been considered that the wavelength division multiplexing transmission is carried out in a wavelength band of 1.55 μm which corresponds to a gain band of an erbium-doped optical fiber amplifier (EDFA). The wavelength band of 1.55 μm is a wavelength band having a center wavelength of 1550 nm like a wavelength band from 1530 nm to 1570 nm.

SUMMARY OF THE INVENTION

Therefore, the present invention is to provide an optical fiber having the following construction and an optical transmission line using the optical fiber, and an optical transmission system.

An optical fiber according to the present invention is characterized in that the chromatic dispersion value thereof at a wavelength of 1.55 μm is set to a value in the range of 4 ps/nm/km to 10ps/nm/km and the cutoff wavelength thereof is set to a value in the range of 1.3 to 1.4 μm.

BRIEF DESCRIPTION OF THE DRAWINGS

Exemplary embodiments of the invention will now be described in conjunction with drawings, in which.

DETAILED DESCRIPTION

Figure 1A:
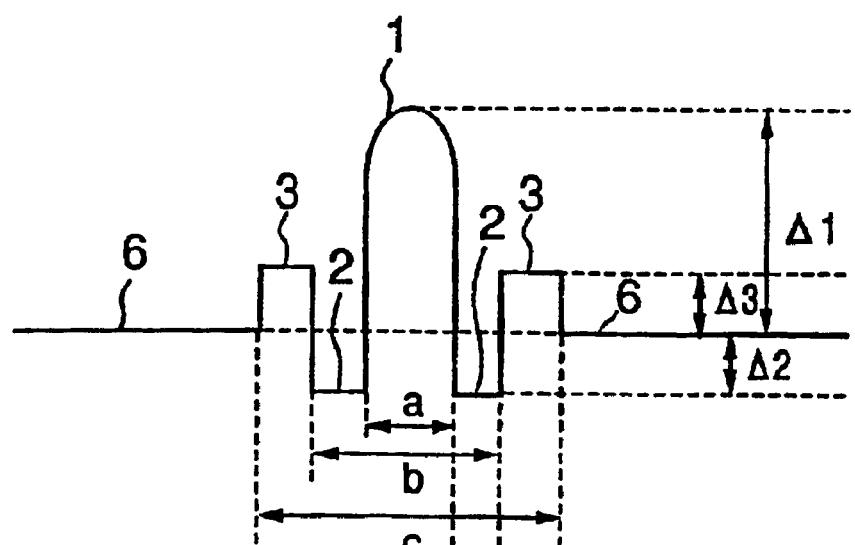
FIG. 1A shows a refractive index profile of a first embodiment of an optical fiber according to the present invention.

In the WDM transmission, if the slope of the dispersion to wavelength (dispersion slope) of an optical fiber is large, the difference of chromatic dispersion between each channel is increased and therefore large-capacity and high bit rate communications can not be obtained. Conversely, if the dispersion slope of the optical fiber for the WDM transmission can be reduced, the difference of chromatic dispersion between each channel can be suppressed. Accordingly, the reduction of the dispersion slope is an indispensable factor for the large-capacity and high bit-rate communications.

However, the reduction of the dispersion slope generally causes reduction of an effective core area, and the reduction of the effective core area causes a non-linear optical phenomenon due to interaction between each channel when the WDM transmission is carried out. That is, signal distortion $\phi_{NL}$ due to the non-linear optical phenomenon is generally represented by the following equation (1), and thus if the effective core area of the optical fiber is small, the signal distortion due to the non-linear optical phenomenon is intensified.

$$\phi_{NL}=(2\pi \times n_2 \times L_{eff} \times P)/(\lambda \times A_{eff}) \qquad (1)$$

In the equation (1), $\pi$ represents the ratio of the circumference of a circle to its diameter, $n_2$ represents a non-linear refractive index, $L_{eff}$ represents an effective optical fiber length, P represents the optical intensity of signal light, $\lambda$ represents a signal light wavelength and $A_{eff}$ represents an effective core area.

Therefore, a study for enlarging the effective core area while the dispersion slope is set to 0.035 ps/nm²/km or Less is reported in Institute Reports OFC'98 ThK4. However, in this report, some characteristic such as cutoff wavelength, bending loss or the like is deteriorated. Therefore, as things are, it is difficult to provide an optical fiber for a transmission line which has both the low dispersion slope and the large effective core area at the same time and also has excellent characteristics such as the cutoff wavelength, the bending loss, etc.

Furthermore, according to an optical fiber for transmission line reported in Institute Reports ECOC98, vol. 1, pp139, the dispersion slope is reduced while the cutoff wavelength is set to 1000 nm and the effective core area is kept to about 55 $\mu^2$. This optical fiber has an excellently balanced characteristic as described above, however, the reduction of the dispersion slope is limited to about 0.045 ps/nm²/km.

Further, various studies of enlarging the transmission band of the WDM transmission have been recently made. For example, a study of enlarging the transmission band is known studies of applying a new type optical amplifier based on a Raman fiber amplifier, a new rare-earth doped optical fiber or the like for the WDM transmission. The studies of applying the new type optical amplifier for the WDM transmission have been actively made, and the practical use of this technique is started.

Under such a background, the WDM transmission trends to be enlarged to a broad wavelength band such as a 1.5 μm wavelength band. The 1.5 μm wavelength band is such a wavelength band as located in the wavelength range of 1460 nm to 1650 nm, and the term of the 1.5 μm wavelength band will be used in this sense.

Among these new types of optical amplifiers, the Raman fiber amplifier is about to be practically used. The Raman fiber amplifier uses a phenomenon that a gain appears at a longer wavelength side shifted from the wavelength of pumping light by about 100 nm by the stimulated Raman scattering which occurs when strong light (pumping light) is incident to an optical fiber. The Raman amplification is a method of irradiating signal light in a wavelength band having the gain to the optical fiber thus stimulated to thereby amplify the signal light.

That is, the WDM transmission using the Raman amplification technique is carried out by inputting pumping light at a wavelength side shorter than the wavelength of signal light by about 100 nm. When the WDM transmission is carried out by using signal light in the 1.55 μm wavelength band, there is a case where pumping light having a wavelength of 1.42 μm (shortest wavelength) is incident to an optical fiber.

In addition to the above techniques, a non-zero dispersion shifted optical fiber (NZ-DSF) has been studied for the WDM transmission. The NZ-DSF has a chromatic dispersion of about +4 ps/nm/km at a wavelength of 1.55 μm, and also has a dispersion slope of 0.045 ps/nm²/km or more at the same wavelength. Accordingly, the zero dispersion wavelength of the NZ-DSF is equal to about 1.45 μm.

That is, the conventional NZ-DSF has a problem that when pumping light of 1.42 μm in wavelength, for example, is incident to an optical fiber, interference based on four-wave mixing or the like occurs because the pumping light wavelength and the zero dispersion wavelength are very close to each other. Even if the NZ-DSF is applied to the WDM transmission of the 1.55 μm wavelength band by using the Raman fiber amplifier, excellent performance cannot be obtained unless this problem is solved.

The absolute value of the chromatic dispersion of a representative NZ-DSF at the wavelength of 1.55 μm is equal to about 4 ps/nm,/km, and the dispersion slope thereof is equal to 0.045 ps/nm²/km or more. Since the NZ-DSF has such a chromatic dispersion characteristic, a dispersion-compensating optical fiber (DCF) used to compensate the dispersion and the dispersion slope is required to have a high dispersion compensation rate (a dispersion slope having a high absolute value).

This is a factor to make the design of DCF difficult, and thus it is difficult to construct an optical transmission system. That is, in addition to the optical amplifier, a dispersion compensator is considered as a module technique important to construct the WDM transmission system. If the design of DCF is difficult as described above, it disturbs construction of the WDM transmission system.

DCF for the NZ-DSF has been recently actively studied in learned societies such as OFC2000/TuG4, etc., and an optical fiber used to compensate the dispersion and the dispersion slope will be described hereunder.

In general, the dispersion compensation performance of a DCF applied to compensate the chromatic dispersion and the dispersion slope is represented by the dispersion compensate rate shown in the following equation (2).

Dispersion compensate rate(%)={(dispersion slope $_{DSCF}$/dispersion slope $_{DSF}$)/(dispersion value $_{DSCF}$)/(dispersion value $_{DSF}$)}×100   (2)

Here, the dispersion slope $_{DSCF}$ indicates the dispersion slope of the DCF, the dispersion slope $_{DSF}$ represents the dispersion slope of an optical fiber (non-zero dispersion shifted optical fiber: NZ-DSF) for a transmission line to which dispersion compensation is applied, the dispersion value $_{DSCF}$ indicates the dispersion value of the DCF, and the dispersion $_{DSF}$ indicates the dispersion value of the optical fiber for the transmission line.

As the dispersion compensate rate represented by the equation (2) is increased toward 100%, the chromatic dispersion in a broad wavelength band can be compensated more entirely. That is, as the dispersion compensate rate is closer to 100%, the chromatic dispersion of the overall optical line can be close to substantially zero in the broad wavelength band. This means that as DPS (dispersion/dispersion slope) of the DCF is closer to DPS of the optical fiber for the transmission line, the chromatic dispersion and the dispersion slope of the optical fiber for the transmission line can be more compensated in the broad wavelength band by the DCF.

Figure 5:
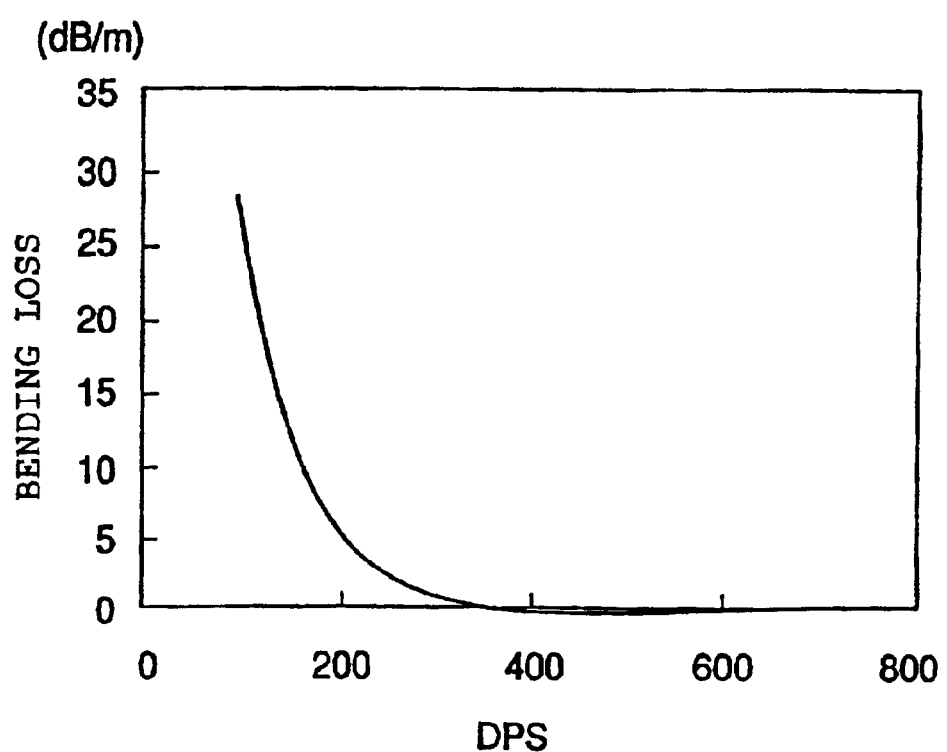
FIG. 5 is a graph showing the relationship between DPS and bending loss of the dispersion-compensating optical fiber.

However, the conventional optical fiber for the transmission path has small DPS, and as DPS of the DCF is reduced to the same level as DPS of the optical fiber for the transmission line, the bending loss characteristic is increased as shown in FIG. 5. The bending loss value shown in FIG. 5 is measured at a diameter of 20 mm φ when light of 1.55 μm is incident.

As described above, the WDM transmission system using the conventional optical fiber for the transmission line needs a DCF having small DPS and small bending loss characteristic, and thus it is difficult to construct the system.

According to a characteristic of the optical fiber of the present invention, there can be provided an optical fiber which can suppress the problems such as interference between pumping light and signal light, etc. and also suppress waveform distortion due to the chromatic dispersion even when the WDM transmission with Raman amplifiers in the 1.5 μm wavelength band is carried out, and is suitably used for the WDM transmission.

Further, according to another characteristic of the optical fiber of the present invention, there is provided an optical fiber which can compensate the chromatic dispersion by using a DCF having low non-linearity, a low dispersion slope and a small bending loss.

The optical transmission line and the optical transmission system according to the present invention are suitably used for the WDM transmission, for example, in the 1.5 μm wavelength band with making the best use of the advantage of the optical fiber.

Preferred embodiments according to the present invention will be described hereunder with reference to the accompanying drawings.

Figure 1B:
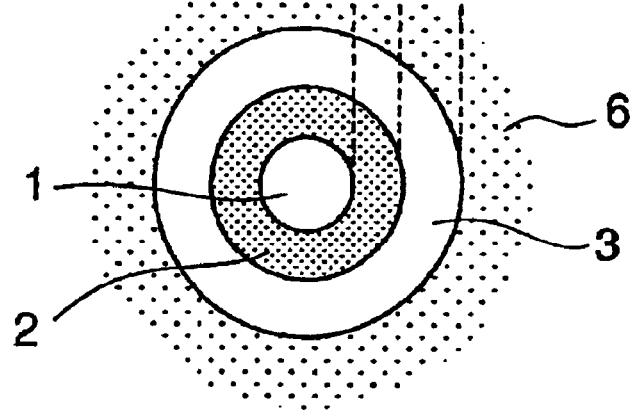
FIG. 1B shows the cross-sectional construction of an optical fiber according to the first embodiment of the present invention.

FIG. 1A shows a refractive index distribution profile of a first embodiment of an optical fiber according to the present invention. FIG. 1B shows the cross-sectional construction of the optical fiber of FIG. 1A Various refractive index profiles may be used as the profile of the refractive index distribution of the optical fiber according to the present invention. However, in this embodiment, such a refractive index profile as shown in FIG. 1A, which is relatively simple in structure and easy to be designed and manufactured, is used.

The optical fiber according to the first embodiment has multi-layered glass layers having different compositions between neighboring layers. In FIG. 1, the optical fiber has a four-layered glass layer, and the four-layered glass layer comprises a first glass layer 1, a second glass layer 2, a third glass layer 3 and a standard layer 6. These glass layers are formed concentrically as shown in FIG. 1B.

The standard layer 6 is a layer (clad layer) serving as a standard of the refractive index distribution in the four glass layers. Inside the standard layer 6 are formed the three glass layers (core glass layer) of the first glass layer 1, the second glass layer 2 and the third glass layer 3.

Further, in the optical fiber according to the first embodiment, the maximum refractive index of the first glass layer 1 formed at the innermost of the optical fiber and the maximum refractive index of the third glass layer 3 formed at the third layer position from the innermost of the optical fiber are set to be higher than the refractive index of the standard layer 6.

Still further, in the optical fiber according to the first embodiment, the minimum refractive index of the second glass layer 2 formed at the second layer position from the innermost of the optical fiber is set to be lower than the refractive index of the standard layer 6. The refractive index distribution shape of the first glass layer 1 exhibits α(alpha)-profile.

The optical fiber of the first embodiment is designed so that Δ1>Δ2>Δ3 is satisfied when the maximum relative refractive index difference of the first glass layer 1 from the standard layer 6 is represented by Δ1, the minimum relative refractive index difference of the second glass layer 2 from the standard layer 6 is represented by Δ2, and the maximum relative refractive index difference of the third glass layer 3 from the standard layer 6 is represented by Δ3.

In this specification, each of the relative refractive index differences Δ1, Δ2, Δ3 are defined by the following equations (3) to (5). Here, $n_1$ represents the maximum refractive index of the first glass layer, $n_2$ represents the maximum refractive index of the second glass layer, and $n_3$ represents the maximum refractive index of the third glass layer.

$$\Delta1=\{(n_1^2-n_6^2)/2n_6^2\}\times100 \quad (3)$$

$$\Delta2=\{(n_2^2-n_6^2)/2n_6^2\}\times100 \quad (4)$$

$$\Delta3=\{(n_3^2-n_6^2)/2n_6^2\}\times100 \quad (5)$$

In the optical fiber of the first embodiment, the diameter of the first glass layer 1 is represented by a, the diameter of the second glass layer 2 is represented by b, and the diameter of the third glass layer 3 is represented by c.

The inventor of this application has made simulations by using as parameters the relative refractive index differences Δ1, Δ2, Δ3, a constant α and the ratio of the diameter a of the first glass layer 1, the diameter b of the second glass layer and the diameter c of the third glass layer 3, and determined the optimum refractive index profile of the optical fiber of the first embodiment.

The simulation condition was set so that the cutoff wavelength of the optical fiber was set in the range of 1.3 μm to 1.4 μm, and the dispersion slope (the average value of the dispersion slope) at the wavelength of 1.55 μm in the 1.5 μm wavelength band was set to a positive value of 0.035 ps/nm²/km or less. Further, the inventor of this application determined the optimum refractive index profile of the first embodiment on the basis of the relationship between the effective core area and the bending loss within this range. In this specification, the cutoff wavelength is measured for an optical fiber of 2 m in length.

As a result, it has been found that it is difficult to set the effective core area to 40 μm² or more when the dispersion slope is set to a positive value of 0.035 ps/nm²/km or less unless the relative refractive index difference Δ1 is set to 0.7% or less. Further, it has been also found that if the relative refractive index difference Δ1 is set to a value less than 0.4%, the bending loss is increased to 5 dB/m or more. Therefore, the relative refractive index difference Δ1 is set to a value within the range of 0.4% to 0.7%.

When the inventor of this application determined an α-constant at which the dispersion slope did not increase when the effective core area was enlarged under the condition that the relative refractive index difference Δ1 was set to a value in the range of 0.4% to 0.7%, the inventor concluded that it was proper to set the α-constant to 4.0 or more.

Next, the inventor has examined the second glass layer 2.

It has been found that if the relative refractive index difference Δ2 is set to a value larger than −0.1%, the dispersion slope is larger than 0.035 ps/nm²/km. Further, it has been also found that if the relative refractive index difference Δ2 is set to a value less than −0.6%, the effective core area is smaller than 40 μm². Therefore, the range of the relative refractive index difference Δ2 is set to the range of −0.6% or more to −0.1% or less.

Further, it has been also found that if the diameter b of the second glass layer 2 is set to a value larger than the diameter a of the first glass layer 1 by more than 2.2 times, the dispersion slope is larger than 0.035 ps/nm²/km. Still further, it has been also found that if the diameter b of the second glass layer 2 is set to a value smaller than the diameter a of the first glass layer 1 by 1.5 time, the effective core area is smaller than 40 μm². Therefore, the diameter b of the second glass layer 2 is set to be 1.5 times or more to 2.2 times or less as large as the diameter a of the first glass layer 1. That is, the range of b/a is 1.5 to 2.2.

Next, the inventor has examined the third glass layer 3.

It has been found that if the relative refractive index difference Δ3 is set to a value larger than 0.4%, the cutoff wavelength is larger than 1.4 μm. Further, it has been also found that if the relative refractive index difference Δ3 is set to a value less than 0.05%, the dispersion slope is larger than 0.035 ps/nm²/km. Therefore, the range of the relative refractive index difference Δ3 is set to the range of 0.05% to 0.4%.

Further, it has been found that if the diameter c of the third glass layer 3 is set to a value larger than 3.5 times the diameter a of the first glass layer 1, the cutoff wavelength is larger than 1.4 μm. Still further, it has been also found that if the diameter c of the third glass layer 3 is set to a value smaller than 2.2 times the diameter a of the first glass layer 1, the dispersion slope is larger than 0.035 ps/nm²/km. Therefore, the diameter c of the third glass layer 3 is set to be 2.2 times or more to 3.5 times or less as large as the diameter a of the first glass layer 1. That is, the range of c/a is set to 2.2 to 3.5.

The optical fiber of the first embodiment has the refractive index profile as described above, and the cutoff wavelength is set in the range of 1.3 μm to 1.4 μm. In addition, the optical fiber of the first embodiment is designed so that the dispersion value at the wavelength of 1.55 μm is set in the range of 4 ps/nm/km or more to 10 ps/nm/km or less.

Further, the optical fiber of the first embodiment is designed so that the dispersion slope in at least a predetermined wavelength region of the 1.55 μm wavelength band is set to a positive value of 0.035 ps/nm²/km or less and the zero dispersion wavelength is set to 1.43 μm or less.

Still further, the optical fiber of the first embodiment is designed so that the effective core area in a predetermined wavelength region the 1.5 μm wavelength band is set in the range of 40 μm² or more to 60 μm² or less.

Still further, the optical fiber of the first embodiment is designed so that the bending loss at the diameter 20 mm in the 1.5 μm wavelength band is set to 5 dB/m or less and the polarization mode dispersion is set to 0.07 ps/√km or less.

The optical fiber of the first embodiment is constructed as described above and it has a cutoff wavelength of 1.3 μm or more, so that the bending loss at the diameter of 20 mm φ in the 1.5 μm wavelength band can be set to 5 dB/m or less.

That is, the optical fiber of the first embodiment has this construction, and thus even, the bending loss of the optical fibers in a optical cable can be reduced.

Further, the cutoff wavelength of the optical fiber of the first embodiment is set to 1.4 µm or less, so that the single mode operation can be surely performed in not only the optical transmission at a wavelength of 1.55 µm, but also the optical transmission at a wavelength of 1.46 µm, and the WDM transmission in the 1.5 µm wavelength band can be carried out.

Still further, the zero dispersion wavelength of the optical fiber of the first embodiment is set to 1.43 µm or less, so that when Raman amplification is carried out in the 1.55 µm wavelength band, interference such as four-wave mixing with pumping light at a wavelength of about 1.4 µm can be suppressed.

Still further, in the optical fiber of the first embodiment, the effective core area in at least a wavelength region (a wavelength band containing at least a wavelength of 1.55 µm) of the 1.5 µm wavelength band is set to 40 µm$^2$ or more. That is, the effective core area of the optical fiber of the first embodiment is set to a value which is equal to or more than the effective core area of the conventional optical fiber for the WDM transmission. Therefore, even when a lumped Raman fiber amplifier is applied to the WDM transmission, distortion of signal light due to the non-linear phenomenon can be suppressed in the optical fiber of the first embodiment.

As well known, the Raman fiber amplifiers are classified into a distributed Raman fiber amplifier and a lumped Raman fiber amplifier. When the lumped Raman fiber amplifier is applied to the WDM transmission, the non-linear phenomenon in the optical fiber cannot be ignored. However, in the optical fiber of the first embodiment, the effective core area in at least a wavelength region of the 1.5 µm wavelength band is set to 40 µm$^2$ or more. Accordingly, by performing the WDM transmission in the wavelength band having the effective core area as described above, the distortion of the signal light can be suppressed.

If the effective core area is excessively large, the efficiency of the Raman amplification would be reduced. In the optical fiber of the first embodiment, the effective core area in at least a wavelength region (wavelength band containing at least a wavelength of 1.55 µm 1.55 µm) of the 1.5 µm wavelength band is set to 60 µm$^2$ or less. Therefore, the optical fiber of the first embodiment can suppress the reduction of the efficiency of the Raman amplification by performing the WDM transmission using the Raman fiber amplifier in the wavelength band in which the effective core area can be obtained.

Still further, in the optical fiber of the first embodiment, the dispersion value at the wavelength of 1.55 µm is set to 10 ps/nm/km or less, so that the distortion due to the chromatic dispersion can be suppressed without large local chromatic dispersion.

Still further, in the optical fiber of the first embodiment, the dispersion slope in the 1.55 µm wavelength and is set to a positive value of 0.035 ps/nm$^2$/km or less to reduce the absolute value of the dispersion slope. Therefore, the optical fiber of the first embodiment can reduce the difference of chromatic dispersion between each channel, so that signal deterioration, which occur when signal is transmitted in a otical fiber, can be prevented.

Still further, if the dispersion slope is reduced, the zero dispersion wavelength is shifted to a shorter wavelength side. Accordingly, the optical fiber of the first embodiment is suitable for the WDM transmission in the 1.5 µm wavelength band to which the Raman fiber amplifier is applied.

Still further, in the optical fiber of the first embodiment, the chromatic dispersion value at the wavelength of 1.55 µm is set to 4 ps/nm/km or more, and the dispersion slope in at least a predetermined wavelength region of the 1.55 µm wavelength band is set to a positive value of 0.035 ps/nm$^2$/km or less to thereby increasing the value of DPS. Accordingly, the optical fiber of the first embodiment can compensate the dispersion slope by using a DCF having a small bending loss.

Still further, the optical fiber of the first embodiment has a small absolute value of the dispersion slope. Therefore, by connecting a conventional dispersion slope compensating optical fiber or the like to the optical fiber of this embodiment, the dispersion slope of the optical fiber can be easily compensated.

Still further, in the optical fiber of the first embodiment, the polarization mode dispersion is set to 0.07 ps/√km or less, thereby avoiding the problem of polarization mode dispersion which occurs in high-speed transmission.

Table 1 shows a specific simulation result of the first embodiment having the refractive index profile shown in FIG. 1A.

This simulation was performed under the condition that the relative refractive index differences Δ1, Δ2, Δ3 and the constant α, and the ratio of the diameter a of the first glass layer 1, the diameter b of the second glass layer 2 and the diameter c of the third glass layer 3 are set in the respective ranges as described above. Further, the inventor determined a refractive index profile with which the dispersion slope could be set to a positive value of 0.035 ps/nm$^2$/km or less and the zero dispersion wavelength is set to 1.43 µm or less while keeping the effective core area at the wavelength of 1.55 µm to about 45 µm$^2$ under the above condition.

[Table 1]

TABLE 1

| | Δ1 % | α | Δ2 % | Δ3 % | a:b:c | Dispersion Ps/nm/km | slope Ps/ nm$^2$/km | Aeff µm$^2$ | λc nm | bending dB/m | λ0 nm | Core diameter µm |
|---|---|---|---|---|---|---|---|---|---|---|---|---|
| #1 | 0.54 | 6 | −0.2 | 0.20 | 0.55:1:1.35 | 5.0 | 0.033 | 46 | 1319 | 2.0 | 1421 | 12.7 |
| #2 | 0.57 | 4 | −0.2 | 0.15 | 0.54:1:1.45 | 5.1 | 0.029 | 44 | 1379 | 2.0 | 1411 | 13.2 |

In the table 1 and the subsequent tables, numbers #1, #2, ... are allocated to simulation samples. "Dispersion" indicates the average value of chromatic dispersion values at the wavelength of 1.55 µm, and "slope" indicates the average value of dispersion slopes at the wavelength of 1.55 µm.
Aeff indicates the effective core area when light at the wavelength of 1.55 µm propagates, λc indicates the cutoff wavelength at the length of 2 m, "bending" indicates the value of the bending loss at the diameter of 20 mm to light at the wavelength of 1.55 µm, and λo indicates the zero dispersion wavelength. "Core diameter" indicates the value of the diameter c of the third glass layer 3, and PMD indicates the polarization mode dispersion.

In the table 1 and the subsequent tables, numbers #1, #2, . . . are allocated to simulation samples. "Dispersion" indicates the average value of chromatic dispersion values at the wavelength of 1.55 μm, and "slope" indicates the average value of dispersion slopes at the wavelength of 1.55 μm.

Aeff indicates the effective core area when light at the wavelength of 1.55 μm propagates, λc indicates the cutoff wavelength at the length of 2 m, "bending" indicates the value of the bending loss at the diameter of 20 mm to the light at the wavelength of 1.55 μm, and λo indicates the zero dispersion wavelength. "Core diameter" indicates the value of the diameter c of the third glass layer 3, and PMD indicates the polarization mode dispersion.

Not shown in the table 1, the polarization mode dispersion is set to 0.07 ps/√km or less for each sample #1, #2.

From the table 1, it has been confirmed that the following characteristics are brought by optimizing the relative refractive index differences Δ1, Δ2, Δ3, the constant a and the ratio of the diameter a of the first glass layer 1, the diameter b of the second glass layer 2 and the diameter c of the third glass layer 3 in the refractive index profile shown in FIG. 1A.

That is, the optical fiber having the refractive index profile having the three-layer structure shown in FIG. 1A can achieve the following values while the bending loss value at the diameter of 20 mm to light at the wavelength of 1.55 μm is set to 5.0 dB/m or less and the cutoff wavelength is set in the range of not less than 1.3 μm or more to 1.4 μm or less.

That is, in the optical fiber having the above structure, the average value of the dispersion slope in the 1.55 μm wavelength band can be set to 0.035 ps/nm²/km or less, the zero dispersion wavelength can be set to 1.43 μm or less, and the effective core area when light at the wavelength of 1.55 μm propagates can be set in the range of 40 μm² or more to 60 μm² or less.

As described above, the optical fiber having the refractive index profile which has the three-layered structure shown in FIG. 1A can achieve both of the low dispersion slope and the low non-linearity. Further, the optical fiber can suppress the interference such as four-wave mixing between Raman amplification pumping lights or the like to some degree even when the transmission in the 1.55 μm wavelength band is carried out by using the Raman amplifying technique because the zero dispersion wavelength λo is smaller than 1.43 μm (1430 nm).

The inventor has found that at least one of characteristics was deteriorated when he made experiments to reduce the dispersion slope in the refractive index profile as shown in FIG. 1A in order to expanding the transmission wavelength band to a shorter wavelength region. That is, it has been found that if the dispersion slope is set to a positive value of 0.025 ps/nm²/km or less as indicated in the samples of the following table 2 (#3, #4), some characteristics are deteriorated.

Therefore, the inventor has made various studies to further expand the transmission wavelength band, particularly to a shorter wavelength region, and has proposed the construction of the following second embodiment of the optical fiber according to the present invention. The optical fiber of the second embodiment has a refractive index profile shown in FIG. 2A, and also has a cross-sectional structure shown in FIG. 2B.

Figure 2A:
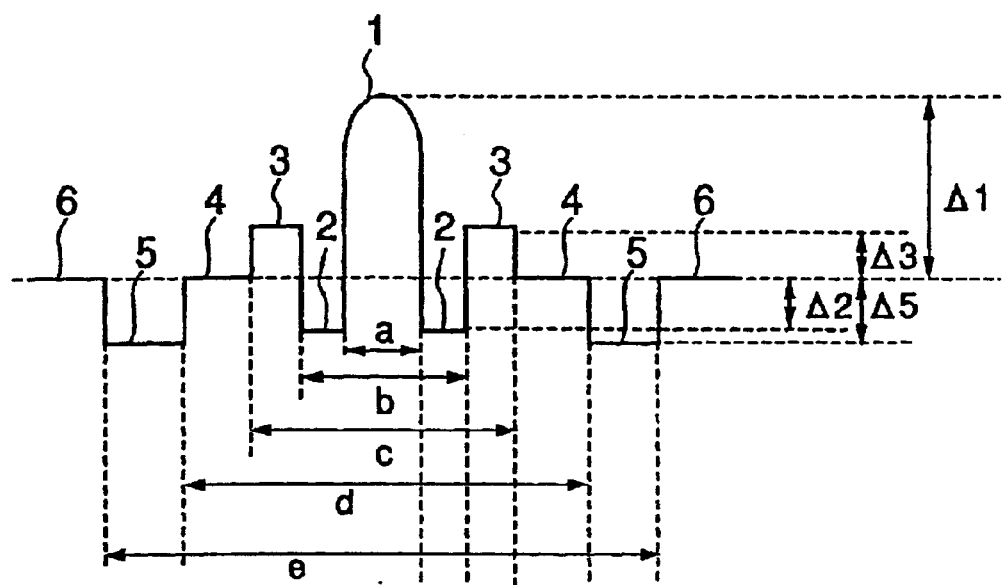
FIG. 2A shows a refractive index profile according to a second embodiment of the optical fiber according to the present invention.
Figure 2B:
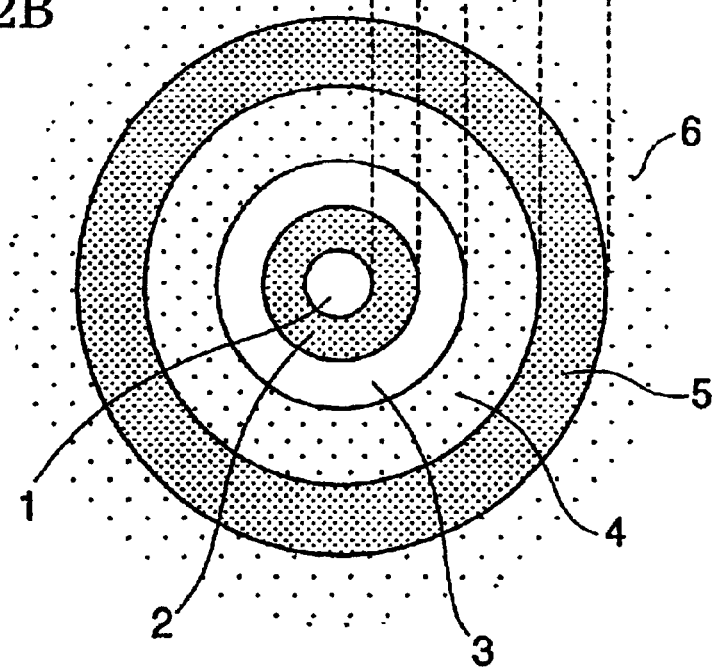
FIG. 2B shows the cross-sectional construction of the optical fiber according to the second embodiment of the present invention.

As shown in FIGS. 2A and 2B, as in the case of the first embodiment, the optical fiber of the second embodiment has a first glass layer 1, a second glass layer 2 and a third glass layer 3 inside a standard layer 6. The construction of the first to third glass layers 1 to 3 is substantially the same as the first embodiment.

Further, in the optical fiber of the second embodiment, a fourth glass layer 4 provided at the outer periphery of the third glass layer 3 and a fifth glass layer 5 provided at the outer periphery of the fourth glass layer 4 are formed between the third glass layer 3 and the standard layer 6. The refractive index of the fourth glass layer 4 is equal to that of the standard layer 6, and the minimum refractive index of the fifth glass layer 5 is set to be lower than the refractive index of the standard layer 6.

Representing the relative refractive index difference of the fourth glass layer 4 from the standard layer 6 by Δ4 and representing the minimum relative refractive index difference of the fifth glass layer 5 from the standard layer 6 by Δ5, the following inequalities are satisfied: Δ1>Δ3>Δ4>Δ>Δ5, or Δ1>Δ3>Δ4>Δ5>Δ2 as shown in FIG. 2A.

In this specification, each relative refractive index difference Δ4, Δ5 is defined by the following equation (6), (7). In each of the equations (6) and (7), $n_4$ represents the refractive index of the fourth glass layer, $n_5$ represents the minimum refractive index of the fifth glass layer and $n_6$ represents the refractive index of the standard layer.

$$\Delta 4 = \{(n_4^2 - n_6^2)/2n_6^2\} \times 100 = 0 \tag{6}$$

$$\Delta 5 = \{(n_5^2 - n_6^2)/2n_6^2\} \times 100 \tag{7}$$

When the construction of the second embodiment is determined, the inventor has found the following probability that the fourth glass layer having the same refractive index as the standard layer 6 is provided at the outer periphery of the third glass layer 3 and the fifth glass layer 5 having a refractive index smaller than the refractive index of the standard layer 6 is provided at the outer periphery of the fourth glass layer 4. That is, it has been found that there is a probability that this structure may have no great effect on the transmission characteristics such as the dispersion slope,

TABLE 2

| | Δ1 % | α | Δ2 % | Δ3 % | a:b:c | Dispersion Ps/nm/km | slope Ps/ nm²/km | Aeff μm² | λc nm | bending dB/m | λ0 nm | Core diameter μm |
|---|---|---|---|---|---|---|---|---|---|---|---|---|
| #1 | 0.52 | 10 | −0.3 | 0.20 | 0.52:1:1.30 | 4.6 | 0.020 | 38 | 1319 | 2.0 | 1395 | 13.0 |
| #2 | 0.54 | 4 | −0.3 | 0.17 | 0.55:1:1.60 | 7.6 | 0.019 | 44 | 1845 | 2.0 | 1345 | 14.0 |

For example, in the sample #3, the effective core area when light at the wavelength of 1.55 μm propagates is less than 40 μm². In the sample #4, the cutoff wavelength is not within the range of 1.3 μm or more to 1.4 μm or less.

the effective core area, etc. of the optical fiber having the refractive index profile which has the three-layered structure, and suppress only the cutoff wavelength to a small value.

Further, the inventor has made the following studies based on the simulations so as to satisfy the condition that the dispersion slope is set to a positive value below 0.025 ps/nm$^2$/km (preferably, about 0.02 ps/nm$^2$/km) and the effective core area when light at the wavelength of 1.55 μm propagates is equal to 40 μm$^2$ or more and also set the cutoff wavelength in the range of 1.3 μm or more to 1.4 μm or less.

First, the inventor selected optical fibers having the refractive index profile which has the three-layered structure like the first embodiment in which the dispersion slope was equal to a positive value of 0.025 ps/nm$^2$/km or less and the effective core area when light at the wavelength of 1.55 μm propagates was equal to 40 μm$^2$ or more. Next, the inventor set the parameters of the first, second and third glass layers 1, 2 and 3 to fixed values, and variously varied the diameter d of the fourth glass layer 4, the diameter e of the fifth glass layer 5 and the relative refractive index difference Δ5 of the fifth glass layer 5 from the standard layer 6 to set the cutoff wavelength in the range of 1.3 μm or more to 1.4 μm or less.

Specifically, the inventor made the following verification with the simulation.

Since the fourth glass layer 4 has the same refractive index as the standard layer 6 in the refractive index profile of FIG. 2A, the refractive index profile has a three-layered structure when no fifth glass layer 5 exists. Accordingly, by comparing the simulation in the three-layered structure and the simulation in the five-layered structure, variation of the cutoff wavelength due to the presence of the fifth glass layer 5 can be found.

First, with respect to the optical fiber having the refractive index profile which has the three-layered structure, there were selected some index profiles with which the effective core area was equal to 40 μm$^2$ or more and the dispersion slope was equal to 0.025 ps/nm$^2$/km or less although the cutoff wavelength was larger than 1.40 μm. Next, the inventor made the simulation in the five-layered structure which was based on the three-layered structure having these index profiles. At this time, the fourth glass layer 4 has the same refractive index as the standard layer 6, and the fifth glass layer 5 has a refractive index lower than the standard layer 6.

In the refractive profile having the five-layered structure thus designed, the inventor set the parameters of the first to third glass layers 1 to 3 to fixed values, and variously varied the diameter d of the fourth glass layer 4, the diameter e of the fifth glass layer 5 and the relative refractive index difference Δ5 of the fifth glass layer 5 to search the optimal index profile. Further, by comparing the result of the simulation for the five-layered structure with the result of the simulation for the three-layered structure, the inventor selected, as the optimal index profile, a index profile that had no great effect on both of the dispersion slope and the effective core area and had an effect of reducing the cutoff wavelength.

As a result, it has been found that if the diameter d of the fourth glass layer 4 is set to a value smaller than 3.5 times the diameter a of the first glass layer 1, the dispersion slope would be larger than 0.025 ps/nm$^2$/km. Further it has been also found that if the diameter d of the fourth glass layer 4 is set to a value larger than 6.5 times the diameter a of the first glass layer 1, the cutoff wavelength would be larger than 1.55 μm. Therefore, the diameter d of the fourth glass layer 4 is set to be 3.5 times or more to 6.5 times or less as large as the diameter a of the first glass layer 1. The refractive index of the fourth glass layer 4 is set to the same refractive index as the standard layer 6.

Next, the verification on the fifth glass layer 5 was made.

It has been found that by reducing the relative refractive index difference Δ5, the cutoff wavelength can be shifted to a shorter wavelength side. However, it has been also found that even when the relative refractive index difference Δ5 is set to −0.6% or less, the effect is saturated and there is such a tendency that the dispersion slope increases little by little. On the other hand, it has been also found that if the relative refractive index difference Δ5 is set to be larger than −0.1%, the cutoff wavelength is larger than 1.55 μm. Therefore, the relative refractive index difference Δ5 is set in the range of −0.6% or more to −0.1% or less.

Further, it has been also found that if the diameter e of the fifth glass layer 5 is set to a value smaller than 5.5 times the diameter a of the first glass layer 1, the chromatic dispersion value is smaller than 4 ps/nm/km, and also it has been found that if the diameter e of the fifth glass layer 5 is set to a value smaller than 7.0 times the diameter a of the first glass layer 1, the dispersion slope is larger than 0.025 ps/nm$^2$/km. Therefore, the diameter e of the fifth glass layer 5 is set to be 5.5 times or more to 7.0 times or less as large as the diameter a of the first glass layer 1. That is, the range of e/a is set of 5.5 to 7.0.

It has been found that if the diameter e of the fifth glass layer 5 is set a value smaller than 1.02 times the diameter d of the fourth glass layer 4, the effect of reducing the cutoff wavelength is lowered. Further, it has been also found that if the diameter e of the fifth glass layer is set to a value larger than 2.0 times the diameter d of the fourth glass layer 4, the bending loss is increased. Therefore, the diameter e of the fifth glass layer 5 is set to be 1.02 times or more to 2.0 times or less as large as the diameter d of the fourth glass layer 4. That is, the range of e/d is set of 1.02 to 2.0.

The inventor has confirmed through the above verifications that the optical fiber having the fourth and fifth glass layer 4 and 5 can have the cutoff wavelength shifted to a shorter wavelength side (i.e., roughly by 0.15 μm to 0.30 μm) as compared with the optical fiber having the three-layered structure.

The optical fiber of the second embodiment is the optical fiber having refractive index profile of the five-layered structure, which has been determined on the basis of the above verifications. In the optical fiber of the second embodiment, the chromatic dispersion value at the wavelength of 1.55 μm is set to 4 ps/nm/km or more and the cutoff wavelength is set in the range of 1.3 or more to 1.4 μm or less. Further, in the optical fiber of the second embodiment, the dispersion slope in at least a predetermined wavelength region of the 1.55 μm wavelength band is set to a positive value of 0.025 ps/nm$^2$/km or less and the zero dispersion wavelength is set to 1.40 μm or less.

Further, the other characteristics of the second embodiment except the dispersion slope and the zero dispersion wavelength are set to the same as the first embodiment, so that the same effect as the first embodiment can be achieved.

Still further, in the second embodiment, the dispersion slope at at least a predetermined wavelength region of the 1.55 μm wavelength band is set to a positive value of 0.025 ps/nm$^2$/km or less and the zero dispersion wavelength is set to 1.40 μm or less. Therefore, according to the second embodiment, when the Raman amplification is carried out in not only the 1.55 μm wavelength band, but also a wider wavelength band of 1.5 μm wavelength band, the interference such as four-wave mixing between pumping lights, etc. can be surely suppressed.

Tables 3A and 3B show a simulation result of the second embodiment having the refractive index profile shown in FIG. 2A.

This simulation was carried out under the condition that the relative refractive index difference Δ1, Δ, Δ3, Δ4, Δ5 and the constant α, and the ratio of the diameter a of the first glass layer 1, the diameter b of the second glass layer 2, the diameter c of the third glass layer 3, the diameter d of the fourth glass layer 4 and the diameter e of the fifth glass layer 5 were set to be within the ranges described above.

Under the above condition, there was determined a refractive index profile which could set the effective core area to the range of 40 to 60 $\mu m^2$ while keeping the dispersion slope to a positive value of 0.025 $ps/nm^2/km$ or less and also keeping the value of the bending loss at the diameter of 20 mm in the 1.5 $\mu m$ wavelength band to 5 dB/m or less.

TABLE 3A

|  | Δ1 % | α | Δ2 % | Δ3 % | Δ4 % | Δ5 % | a:b:c:d:e |
|---|---|---|---|---|---|---|---|
| Cf1 | 0.57 | 4 | −0.3 | 0.20 | — | — | 0.54:1:1.45 |
| #5 | 0.57 | 4 | −0.3 | 0.20 | 0 | −0.5 | 0.54:1:1.45:2.5:2.7 |
| Cf2 | 0.56 | 6 | −0.4 | 0.30 | — | — | 0.55:1:1.35 |
| #6 | 0.56 | 6 | −0.4 | 0.30 | 0 | −0.3 | 0.55:1:1.35:2.2:2.4 |

TABLE 3B

|  | Dispersion Ps/nm/km | slope Ps/nm²/km | Aeff μm² | λc nm | bending dB/m | λo nm | Core diameter μm |
|---|---|---|---|---|---|---|---|
| Cf1 | 6.1 | 0.017 | 42 | 1606 | 2.0 | 1368 | 13.6 |
| #5 | 6.3 | 0.019 | 42 | 1387 | 2.0 | 1373 | 13.5 |
| Cf2 | 4.6 | 0.007 | 41 | 1561 | 0.5 | 1367 | 12.9 |
| #6 | 5.0 | 0.012 | 40 | 1373 | 0.5 | 1359 | 13.0 |

The characteristics and the core diameter of examples (samples cf1, cf2) in which neither the fourth glass layer 4 nor the fifth glass layer 5 was provided are shown in the tables 3A and 3B.

Not shown in the tables 3A and 3B, in each sample #5, #6, the polarization mode dispersion was set to 0.07 ps/√km or less.

From the tables 3A and 3B, it has been confirmed that the following characteristics can be obtained by optimizing the relative refractive index differences Δ1, Δ2, Δ3, Δ4, Δ5 in the refractive index profile shown in FIG. 2A and the constant α, and the ratio of the diameter a of the first glass layer 1, the diameter b of the second glass layer 2, the diameter c of the third glass layer 3, the diameter d of the fourth glass layer 4 and the diameter e of the fifth glass layer 5.

That is, it was confirmed that the optical fiber having the refractive index profile which had the five-layered structure shown in FIG. 2A had the same effect as the first embodiment, and further the average value of the dispersion slope in the 1.55 $\mu m$ wavelength band could be set to 0.025 $ps/nm^2/km$ or less and the zero dispersion wavelength could be set to 1.40 $\mu m$ or less.

Prototypes

Tables 4A and 4B show the characteristics, etc. of a prototype A formed on the basis of the design of the optical fiber of the sample #2 in the table 1 and a prototype B formed on the basis of the design of the optical fiber of the sample #6 in the tables 3A and 3B. A characteristic line a in FIG. 3 indicates the chromatic dispersion characteristic of the optical fiber of the prototype A, and a characteristic line b in FIG. 3 indicates the chromatic dispersion characteristic of the optical fiber of the prototype B.

TABLE 4A

|  | Δ1 % | α | Δ2 % | Δ3 % | Δ4 % | Δ5 % | a:b:c:d:e |
|---|---|---|---|---|---|---|---|
| A | 0.57 | 4 | −0.2 | 0.16 |  |  | 0.54:1:1.45 |
| B | 0.56 | 6 | −0.4 | 0.30 | 0 | −0.3 | 0.55:1:1.35:2.2:2.4 |

TABLE 4B

|  | Dispersion Ps/nm/km | slope ps/nm²/km | Aeff μm² | λc nm | λo nm | Bending dB/m | Loss dB/km | PMD |
|---|---|---|---|---|---|---|---|---|
| A | 5.3 | 0.031 | 45.2 | 1379 | 1407 | 0.5 | 0.216 | 0.05 |
| B | 5.3 | 0.010 | 40.6 | 1369 | 1346 | 0.5 | 0.217 | 0.06 |

Figure 3:
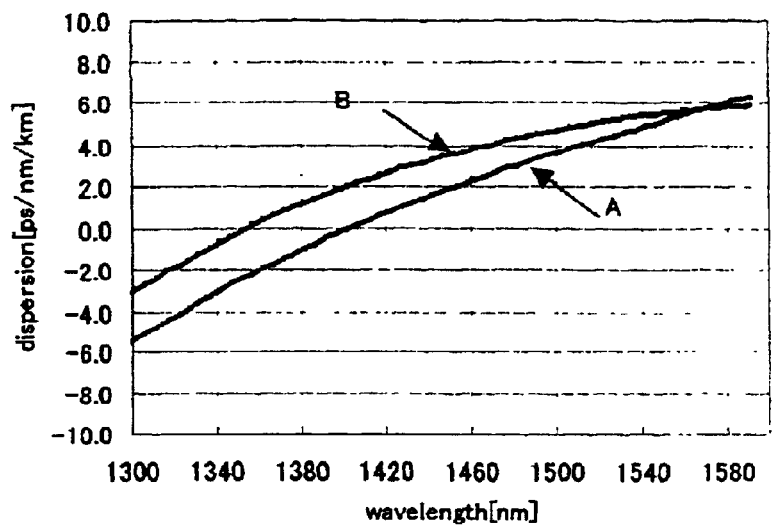
FIG. 3 is a graph showing an example of a chromatic dispersion characteristic of the optical fiber according to the present invention.

As is apparent from the tables 4A and 4B, and FIG. 3, like the design values, each of these prototype optical fibers A and B has low chromatic dispersion and a low dispersion slope, and also has a low bending loss. The zero dispersion wavelength of the prototype A is equal to 1407 nm, and the zero dispersion wavelength of the prototype B is equal to 1346 nm. As described above, the zero dispersion wavelengths of these prototypes A and B are equal to about 1400 nm or to 1400 nm or less, so that the problem of occurrence of the interference between pumping lights can be prevented when the WDM transmission in the 1.5 $\mu m$ wavelength band is carried out by using Raman amplifiers.

It has been confirmed that each of the optical fibers of the prototypes A and B has an effective core area of 40 $\mu m^2$ or more and it has low transmission loss and low polarization-dependence loss when light at the wavelength of 1.55 $\mu m$ propagates therethrough.

Accordingly, it has been confirmed that each optical fiber of the prototypes A and B is suitable for the WDM transmission in the 1.5 $\mu m$ wavelength band, and further it has excellent compatibility with a DCF and a Raman amplifier.

Figure 4:
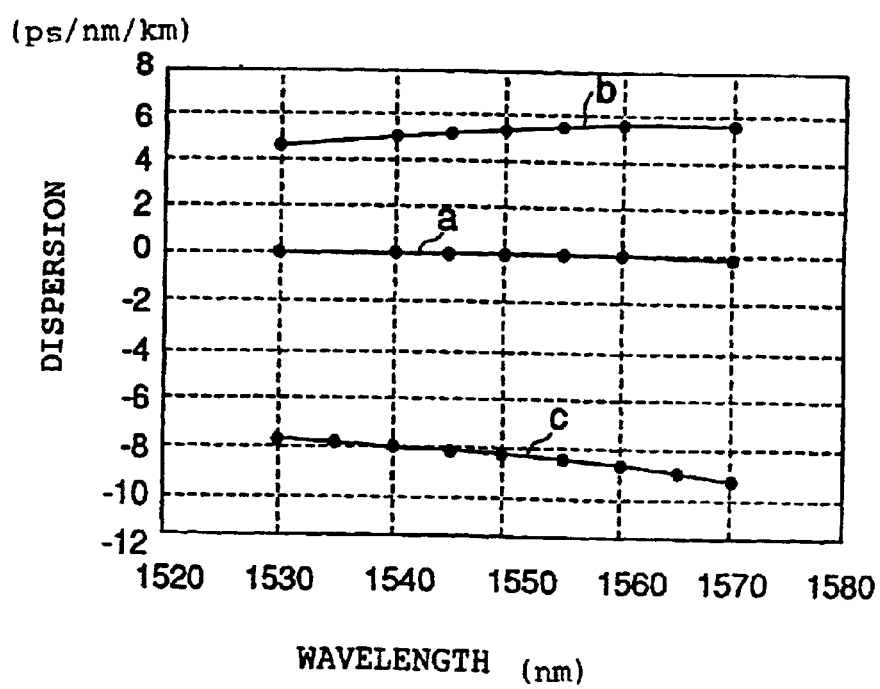
FIG. 4 is a graph showing chromatic dispersion characteristics of an optical fiber according to the present invention, a dispersion-compensating optical fiber for the optical fiber, and an optical transmission line connecting (or splicing) both the optical fibers.

A characteristic line b of FIG. 4 shows a chromatic dispersion characteristic of an example of the optical fiber according to the present invention, a characteristic a of FIG. 4 shows a chromatic dispersion characteristic when a conventional DCF having a chromatic dispersion characteristic shown by a characteristic line c of FIG. 4 is connected to the optical fiber of the present invention.

As is apparent from these characteristic lines a to c, the dispersion slope of the optical fiber having the characteristic shown by the characteristic line b can be easily compensated by the conventional DCF. Accordingly, the chromatic dispersion in the wide wavelength band of 1.5 $\mu m$ wavelength band can be substantially set to zero by using the optical fiber of the present invention as an optical fiber for transmission and compensating the dispersion slope with a conventional DCF.

The present invention is not limited to the above embodiments, and various modifications may be made to these embodiments. For example, the optical fiber of the present invention may have a refractive index profile other than the refractive index of the above-described embodiments. It is sufficient to design the optical fiber of the present invention so that the dispersion value at the wavelength of 1.55 $\mu m$ is set in the range of 4 ps/nm/km or more to 10 ps/nm/km or less and the cutoff wavelength is set in the range of 1.3 or more to 1.4 $\mu m$ or less as indispensable factors.

Further, it is preferable in the optical fiber of the present invention that the effective core area, the chromatic dispersion value and the dispersion slope at least a predetermined wavelength region of the 1.5 μm wavelength band are set to proper values, and the zero dispersion wavelength is set to 1.4 μm or less, whereby an optical fiber which can perform the WDM transmission in the 1.5 μm wavelength band using a Raman amplifier with high quality and also an optical transmission system using the optical fiber can be constructed.

Even when the zero dispersion wavelength is set to 1.43 μm, there can be constructed an optical fiber which can perform the WDM transmission in the 1.55 μm wavelength band using the Raman amplifier with high quality while suppressing the four-wave mixing, and also an optical transmission system using the optical fiber.

In the above embodiments, the optical fiber and the optical transmission system are applied to the WDM transmission in the 1.5 μm wavelength band using the Raman amplifier. However, the optical fiber and the optical transmission system of the present invention may be applied to the WDM transmission using an erbium-doped optical fiber amplifier. Further, the present invention may be applied to the WDM transmission in not only the 1.5 μm wavelength band, but also in other wavelength bands by modifying the construction of the optical fiber.

What is claimed is:

1. An optical fiber, characterized in that the chromatic dispersion value thereof at a wavelength of 1.55 μm is set in the range of 4 ps/nm/km or more to 10 ps/nm/km or less, and the cutoff wavelength thereof is set in the range of 1.3 μm to 1.4 μm.

2. The optical fiber according to claim 1, wherein the dispersion slope thereof in at least a predetermined wavelength region of the 1.55 μm wavelength band is set to a positive value of 0.035 ps/nm$^2$/km or less.

3. The optical fiber according to claim 1, wherein the dispersion slope thereof in at least a predetermined wavelength region of the 1.55 μm wavelength band is set to a positive value of 0.025 ps/nm$^2$/km or less.

4. The optical fiber according to claim 1, wherein the zero dispersion wavelength thereof is set to 1.43 μm or less.

5. The optical fiber according to claim 1, wherein the zero dispersion wavelength thereof is set to 1.40 μm or less and the dispersion is set to 2 ps/nm/km or more at a wavelength of 1.46 μm or more.

6. The optical fiber according to claim 1, wherein the zero dispersion wavelength thereof is set to 1.40 μm or less, and the dispersion is set to 2 ps/nm/km or more at a wavelength of 1.40 μm or more.

7. The optical fiber according to claim 1, wherein the effective core area thereof in at least some of a 1.5 μm wavelength band is set in the range of 40 m$^2$ or greater to 60 μm$^2$ or less.

8. The optical fiber according to claim 1, wherein the bending loss thereof at a diameter of 20 mm in the 1.5 μm wavelength band is set to 5 dB/m or less.

9. The optical fiber according to claim 1, wherein the polarization mode dispersion thereof in the 1.5 μm wavelength band is set to 0.07 ps/√km or less.

10. The optical fiber according to claim 1, wherein said optical fiber comprises multi-layered glass layers having different compositions between neighboring layers, plural glass layers are formed inside a standard reference serving as a standard of a refractive index distribution in said multi-layered glass layers, and the maximum refractive index of a first glass layer formed at the innermost of said optical fiber and the maximum refractive index of a third glass layer formed at a third-layer position from the innermost of said optical fiber are set to be larger than the refractive index of said standard layer while the minimum refractive index of a second glass layer at a second-layer position from the innermost of said optical fiber is set to be lower than the refractive index of said standard layer.

11. The optical fiber according to claim 10, wherein the refractive index of a fourth glass layer formed at a fourth-layer position from the innermost of said optical fiber is set to be equal to the refractive index of said standard layer, and the minimum refractive index of a fifth glass layer formed at a fifth-layer position from the innermost of said optical fiber is set to be lower than the refractive index of said standard layer.

12. The optical fiber according to claim 10, wherein the relative refractive index difference Δ1 of said first glass layer from said standard layer is set in the range of 0.4% or more to 0.7% or less, the refractive index distribution shape of said first glass layer is set to an α(alpha) profile and a constant α is set to 4 or more.

13. The optical fiber according to claim 10, wherein the relative refractive index difference Δ2 of said second glass layer from said standard layer is set in the range of −0.6% or more to −0.1% or less, the diameter of said second glass layer is set to be 1.5 times or more to 2.2 times or less as large as the diameter of said first glass layer, the relative refractive index difference Δ3 of said third glass layer from said standard layer is set in the range of 0.05% or more to 0.4% or less, and the diameter of said third glass layer is set to be 2.2 times or more to 3.5 times or less as large as the diameter of said first glass layer.

14. The optical fiber according to claim 11, wherein the diameter of said fourth glass layer is set to be 3.5 times or more to 6.5 times or less as large as the diameter of said first glass layer, the relative refractive index difference Δ5 of said fifth glass layer from said standard layer is set in the range −0.6% or more to −0.1% or less, and the diameter of said fifth glass layer is set to be 5.5 times or more to 7.0 times or less as large as the diameter of said first glass layer and 1.02 times or more to 2.0 times or less as large as the diameter of said fourth glass layer.

15. An optical transmission line comprising: said optical fiber according to claim 1 disposed at least a part of said optical transmission line.

16. An optical transmission system comprising a Raman amplifier and said optical transmission line according to claim 15.

* * * * *